(12) United States Patent
Abiri et al.

(10) Patent No.: US 11,172,322 B2
(45) Date of Patent: Nov. 9, 2021

(54) WIRELESS ACCESS AUTHENTICATION BASED ON USER LOCATION

(71) Applicant: GuRu Wireless, Inc., Pasadena, CA (US)

(72) Inventors: Behrooz Abiri, Pasadena, CA (US); Florian Bohn, Pasadena, CA (US); Seyed Ali Hajimiri, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 0 days.

(21) Appl. No.: 16/205,043

(22) Filed: Nov. 29, 2018

(65) Prior Publication Data

US 2019/0222955 A1 Jul. 18, 2019

Related U.S. Application Data

(60) Provisional application No. 62/592,210, filed on Nov. 29, 2017.

(51) Int. Cl.
*H04W 4/00* (2018.01)
*H04W 4/021* (2018.01)
*H04L 29/06* (2006.01)

(52) U.S. Cl.
CPC .......... *H04W 4/021* (2013.01); *H04L 63/107* (2013.01)

(58) Field of Classification Search
CPC ....... H04W 64/00; H04W 4/02; H04W 4/023; H04W 4/021
See application file for complete search history.

(56) References Cited

U.S. PATENT DOCUMENTS

| | | | | |
|---|---|---|---|---|
| 6,271,757 | B1 * | 8/2001 | Touchton | A01K 15/02 119/721 |
| 6,819,706 | B1 * | 11/2004 | Lim | H03G 3/3078 375/130 |
| 2003/0114169 | A1 * | 6/2003 | Okamura | G01S 3/48 455/456.1 |
| 2009/0300688 | A1 * | 12/2009 | Karaoguz | H04N 21/2402 725/62 |
| 2014/0256352 | A1 * | 9/2014 | Kim | G01S 5/04 455/456.1 |
| 2017/0179771 | A1 * | 6/2017 | Leabman | H02J 50/15 |
| 2017/0188189 | A1 * | 6/2017 | van Loon | H04W 4/021 |
| 2017/0307744 | A1 * | 10/2017 | Loesch | G01S 7/03 |
| 2019/0064364 | A1 * | 2/2019 | Boysel | G01S 17/933 |
| 2019/0146071 | A1 * | 5/2019 | Donovan | G01S 7/4868 |

\* cited by examiner

*Primary Examiner* — Omoniyi Obayanju
(74) *Attorney, Agent, or Firm* — Weaver Austin Villeneuve & Sampson LLP

(57) ABSTRACT

A wireless service delivery system determines the position of a device requesting the wireless service and delivers a wireless service to the device if the device's position is determined to fall within a predefined region of a space. The wireless service delivery may deliver no service or a lower quality/slower service if the device is determined to fall outside the predefined region of the space. The coordinates of the points along the perimeter of the predefined region are stored in a memory and are optionally established during a setup phase by moving a localization device along the perimeter of the region of the space.

30 Claims, 5 Drawing Sheets

WIRELESS ACCESS AUTHENTICATION BASED ON USER LOCATION

CROSS REFERENCE TO RELATED APPLICATIONS

The present application claims benefit under 35 USC 119(e) of U.S. Application Ser. No. 62/592,210, filed Nov. 29, 2017, the content of which is incorporated herein by reference in its entirety.

FIELD OF THE INVENTION

The present invention relates to user authentication, and more particularly to location based authentication.

BACKGROUND OF THE INVENTION

Authentication is of paramount importance in wireless communication and services of all kinds. Authentication not only allows the service providers to provide wireless service to users, it also enables the provision of different tiers and quality of services for different users while preventing unauthorized access.

Many wireless systems, such as WiFi, use password or key-based authentication techniques. Cell phone carriers use the serial number (IMEI) of the phone or a SIM card for authenticating the users. Such authentications require the user to obtain the proper password/key or device/SIM card from the service provider before the user is granted access to use the service.

BRIEF SUMMARY OF THE INVENTION

A method of wireless service delivery, in accordance with one embodiment of the present invention, includes, in part, determining a position of a first device requesting the wireless service, delivering a wireless service defined by a first tier/quality to the first device if the position of the first device is determined to fall within a first region of space, and delivering a wireless service defined by a second tier/quality to the first device if the position of the first device is determined not to fall within the first region of space. In one embodiment the first tier/quality of service has a faster access than the second class/quality of service. In one embodiment, no service is provided by the second tier/quality of service.

In one embodiment, the method further includes, in part, storing a multitude of coordinates representative of the boundary of the first region of space. In one embodiment, the coordinates are stored in a memory disposed in a second device providing the wireless service. In one embodiment, the method further includes, in part, identifying the multitude of coordinates by a localization device that is physically distinct from the second device. In one embodiment, the position of the first device is determined by the localization device.

In one embodiment, the method further includes, in part, identifying the multitude of coordinates during a setup phase by moving the localization device along a perimeter of the first region of space. In one embodiment, the second device includes, in part, a controller adapted to increase the frequency of a first RF signal the second device transmits to the localization device.

In one embodiment, the localization device includes, in part, a mixer adapted to downconvert the frequency of the first RF signal, a bandpass filter adapted to filter out the components of the downconverted RF signal that fall outside a predefined frequency band, an amplifier adapted to amplify the filtered RF signal, and an antenna adapted to transmit the amplified RF signal.

In one embodiment, the second device further includes, in part, a receiver adapted to receive the amplified RF signal transmitted by the localization device. In such embodiments, the controller is further adapted to determine the position of the localization device by comparing the first RF signal to the amplified RF signal. In one embodiment, the frequency is increased linearly in time.

In one embodiment, the method further includes, in part, transmitting an RF signal from the second device, positioning a reflector in the path of the transmitted RF signal thereby causing a reflected RF signal to reach the first device, transmitting information from the first device to the second device about an amount of power in the reflected RF signal received by the first device, and determining the position of the first device relative to the second device from the received power information.

In one embodiment, the method further includes, in part, transmitting a first RF signal from the second device to the first device where the RF signal includes, in part, a first time stamp, receiving the first RF signal at the first device, recovering the first time stamp at the first device, recording a time at which the first RF signal is received by the first device where the recorded time corresponds to a second time stamp, and determining the position of the first device relative to the second device from the first and second time stamps.

In one embodiment, the method further includes, in part, charging the first device using the RF signal carrying the wireless service. In one embodiment, the method further includes, in part, forming a synthetic aperture radar to deliver an RF signal to the first device. In one embodiment, the method further includes, in part, sending a multitude of electromagnetic pulses scanning along a multitude of azimuth and elevations where the multitude of pulses are oriented toward the first device, and providing a 3-D mapping of the position of the first device from the time of flight of pulses reflected by the first device.

In one embodiment, the method further includes, in part, transmitting a time-encoded acoustic signal from the second deice to the first device, recovering the encoded time at the first device, comparing a time at which the acoustic signal is received by the first device to the encoded time to determine a time difference, and determining the position of the first device relative to the second device from the time difference. In one embodiment, the second device is a phased array.

A wireless service delivery system, in accordance with one embodiment of the present invention, is configured to: determine a position of a first device requesting the wireless service, deliver a wireless service having a first tier/quality to the first device if the position is determined to fall within a first region of space, and deliver a wireless service having a second tier/quality to the first device if the position is determined not to fall within the first region of space.

In one embodiment, the first tier/quality of service results in a faster access than the second class/quality of service. In one embodiment, the second tier/quality of service amounts to no service. In one embodiment, the wireless service delivery system further includes, in part, a memory storing a multitude of coordinates of the boundary of the first region of space. In one embodiment, the wireless service delivery system further includes, in part, a localization device adapted to identify the multitude of coordinates.

In one embodiment, the localization device is further adapted to determine the position of the first device. In one embodiment, the localization device is further adapted to identify the multitude of coordinates during a setup phase as it is moved along a perimeter of the first region of space. In one embodiment, the wireless delivery system further includes, in part, a controller adapted to increase the frequency of a first RF signal the wireless service delivery system transmits to the localization device.

In one embodiment, the localization device includes, in part, a mixer adapted to downconvert the frequency of the first RF signal, a bandpass filter adapted to filter out components of the downconverted RF signal that fall outside a predefined frequency band, an amplifier adapted to amplify the filtered RF signal, and an antenna adapted to transmit the amplified RF signal.

In one embodiment, the wireless service delivery system further includes, in part, a receiver adapted to receive the amplified RF signal transmitted by the localization device. A controller determines the position of the localization device by comparing the first RF signal to the amplified RF signal. In one embodiment, the frequency is increased linearly in time.

In one embodiment, the wireless service delivery system is further adapted to charge the first device using an RF signal via which the wireless service is delivered. In one embodiment, the wireless service delivery system is further adapted to form a synthetic aperture radar to deliver an RF signal to the first device. In one embodiment, the wireless service delivery system is further adapted to send a multitude of electromagnetic pulses scanning along a multitude of azimuth and elevations where the pulses are oriented toward the first device, and provide a 3-D mapping of the position of the first device from the time of flight of the pulses reflected by the first device. In one embodiment, the wireless service delivery system is a phased array.

DETAILED DESCRIPTION OF THE INVENTION

It is often desirable to provide wireless service to users based on their locations. For example, a coffee shop owner/operator may want to provide a free wireless Internet access to users located within its premises but not to anyone outside of the coffee shop. In another example, a service provider in an airport terminal may wish to provide faster Internet access or added features to people in a VIP zone, and slower access in other areas.

A location based access authentication would allow users to have proper access without interaction with the service provider. For example, in wireless power delivery, location based authentication enables remote charging/powering of user devices that have been authorized based on the location of the devices. It is also desirable to allow for different tiers of power delivery based on the location of the users. For example, a user in a VIP area may receive more power than a user who is not in the VIP area. Therefore, a user device(s) located in, for example, a VIP area may be wirelessly charged faster than devices that are outside the VIP area.

The following embodiments of the present invention are described with reference to methods and systems that enable location based access authentication for wireless power delivery. It is understood however that embodiments of the present invention are equally applicable to location based access authentication in a variety of other wireless applications, such as data communication systems (e.g., 5G and massive MIMO systems), sensing and the like.

In one embodiment, a location-based access authentication system includes, in part, a device associated with the service provider that provides a service, and/or a localization device adapted to determine the location of a user requesting the service. The localization device is in communication with the service provider to, among other things, provide the location of a user. In other embodiments, the localization device is integrated in the same device as the service provider. The following description of a number of embodiments of the present invention is described with reference to a service provider that has an integrated localization device. It is understood however that, as described above, the service provider and the localization device may be different physical devices operating under the control of the service provider.

In one embodiment, the service provider provides services based on a set of rules and in accordance with one or more algorithms that determine what service(s), if any, is to be provided to the users at various locations. Such rules and algorithm use the location as a factor in determining the tier/quality of the service. The rules set that provides a mapping between the authorized service level and the location of the user may be generated in several ways, as described further below.

Figure 1:
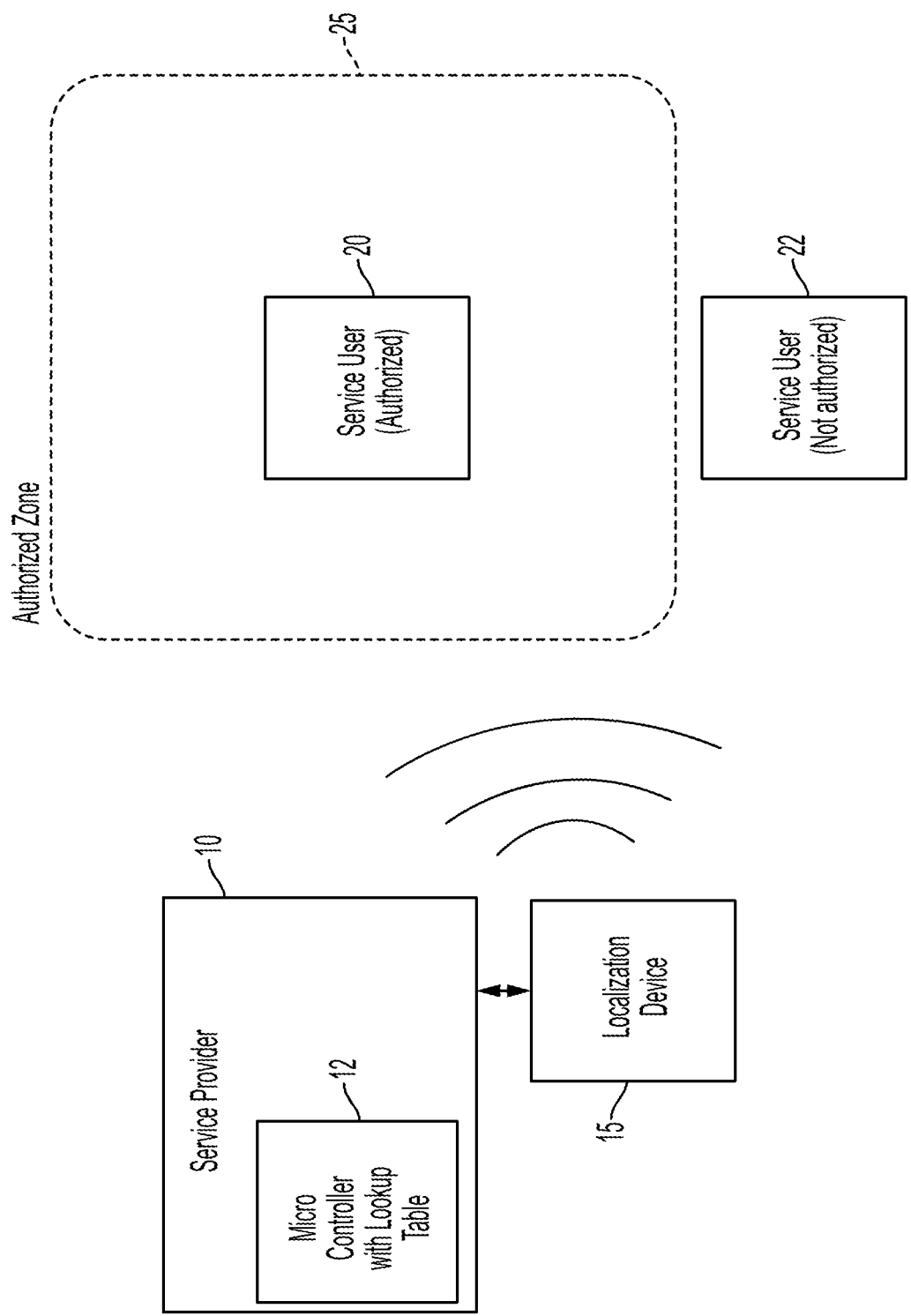
FIG. 1 is a simplified high-level block diagram of a location-based wireless service delivery system, in accordance with one exemplary embodiment of the present invention.

FIG. 1 is a simplified high-level block diagram of a wireless service provider device 10 (alternatively referred to herein as service provider) adapted to provide wireless service to device user 20 (alternatively referred to herein as user) positioned within authorized zone 25, and not to provide service to user 22 positioned outside zone 25, in accordance with one embodiment of the present invention. Service provider 10 is shown as including, in part, a controller 12 that accesses a look-up table to determine the rules and algorithms that define what services, if any, is to be provided to users at various locations. Localization device 15 is adapted to locate the position of each user 15 in order to apply the rules and algorithms.

Figure 2:
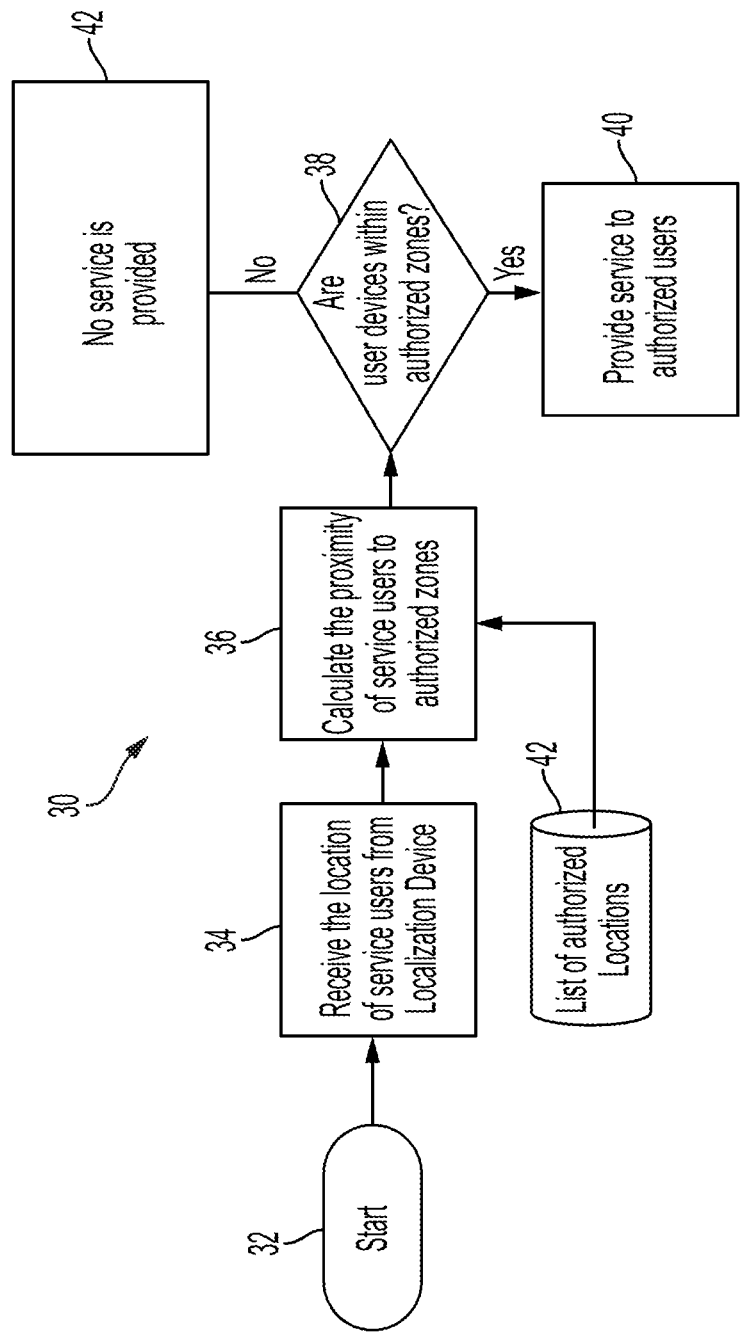
FIG. 2 is a flowchart for a location-based wireless service delivery, in accordance with one exemplary embodiment of the present invention.

FIG. 2 is a flowchart 30 for location based access authorization, in accordance with one embodiment of the present invention. The process starts at 32. At 34, a localization device, such as device 15 shown in FIG. 2, establishes the location of the user service. At 36, using a list of authorized locations/zones, the proximity of the user to the authorized zones, such as the zone 25 shown in FIG. 1, is determined. If at 36, the user is detected as being within an authorized zone, the service provider begins to provide service to the user. Otherwise, the service provider does not provide service to the user.

In accordance with one embodiment, the rule set is formed during an initial procedure by placing a localization device (alternatively referred to herein as service setup device), which is in communication with the service provider, in each of the desired locations and specifying the service level for each such location. The space (also referred to herein alternatively as zone) defined, for example, by a first set of such locations receives the same, e.g., level-1 service; the space defined, for example, by a second set of such locations receives the same, e.g. level-2 service, and the like. Areas outside, e.g., the second zone will not receive any service. The coordinates of the service setup device at each location may be identified using any known or future position determination technique, such as GPS, lasers, and the like. In one embodiment, the service setup device also provides the type of service (tier or quality of service) designated for each location.

Figure 3:
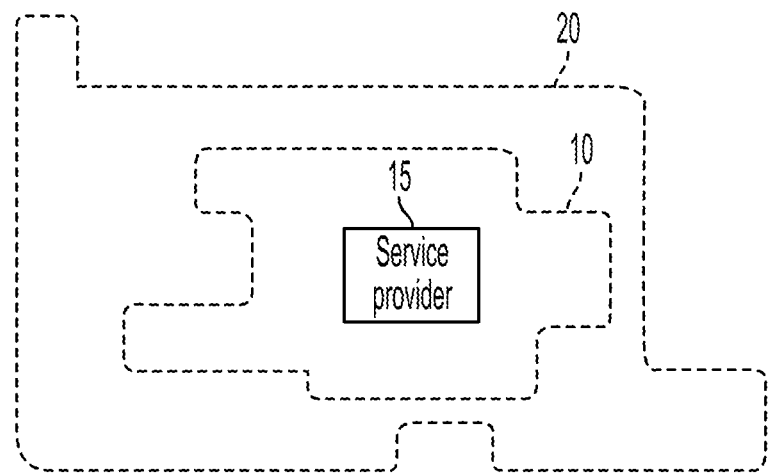
FIG. 3 shows perimeters of different regions of a space receiving different tiers of wireless service, in accordance with one exemplary embodiment of the present invention.

In accordance with another exemplary embodiment of the present invention, a zone defined to receive the same service level is determined by moving the localization device along the perimeter of the zone. Knowing the coordinates of each point along the perimeter, the service provider establishes the rule set such that the points internal to the perimeter of the zone are given access to the same service level. FIG. 3 shows a perimeter 10 within whose boundary, service provider 15 is configured to provide a level-1 service. Likewise, the area defined between perimeters 10 and 20 receive a level-2 service from service provider 15. The area outside perimeter 20 is indicated not to receive service from service provider 15.

In one embodiment, the localization device includes an active radio frequency (RF), microwave or mm-wave ranging sensor that performs the localization (i.e., position determination). In accordance with one such embodiment, to determine the distance between two devices, such as the distance between the service provider and the localization device, the service provider sends an RF signal that linearly increases in frequency. The localization device downconverts, and amplifies the received RF signal before transmitting it back to the service provider. By comparing the transmitted RF signal to the RF signal that the service provider receives from the localization device, the service provider determines the position of the localization device.

Figure 4:
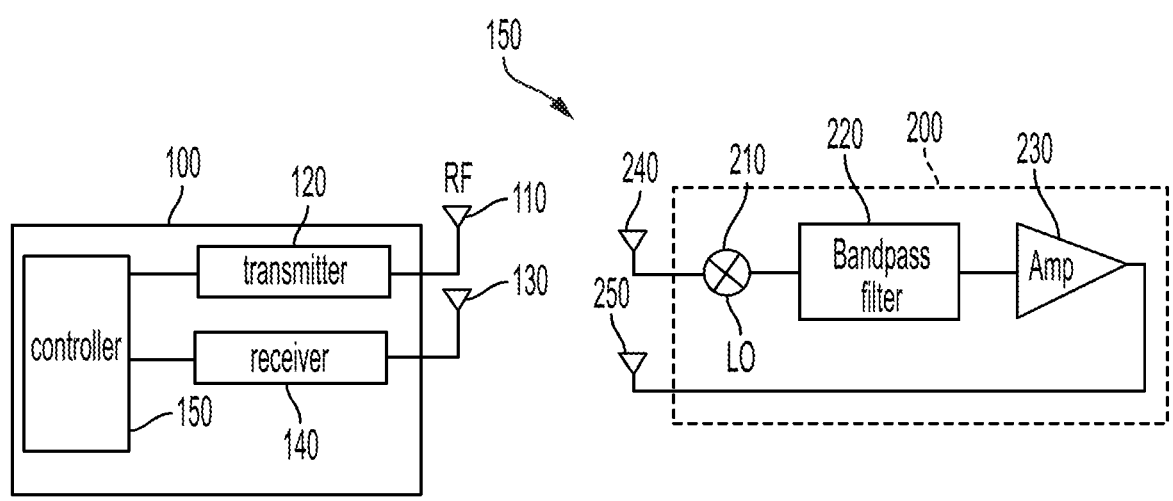
FIG. 4 is a simplified high-level block diagram of a position determination system, in accordance with one exemplary embodiment of the present invention.

FIG. 4 is a simplified high-level block diagram of a system 150 configured to determine the distance between first and second devices 100, 200 disposed therein, in accordance with one exemplary embodiment of the present invention. Device 100—which may correspond to a service provider device as described above—is shown as including a transmitter 120, a receiver 140, a controller 150, a transmit antenna 110 and a receive antenna 130. Device 200—which may correspond to a localization device as described above—is shown as including a mixer 210, a bandpass filter 220, an amplifier 230, a transmit antenna 250 and a receive antenna 240.

Controller 150 causes transmitter 120 to transmit an RF signal (via antenna 110) with a frequency that increases, e.g., linearly, with time. For example, assume transmitter 120 transmits an RF signal whose frequency at times T1 and T2 are respectively 10 GHz and 11 GHz due to such an increase. Device 200 downconverts the RF signal—which it receives via receive antenna 240—using mixer 210 to an intermediate frequency. For example, assume that mixer 210 downconverts the received 10 GHz and 11 GHz frequency signals to 2 GHz and 3 GHz signals (i.e., the frequency offset is 8 GHz) using the local oscillator signal applied to mixer 210. Bandpass filter 220 filters out the components of mixer 210's output that fall outside the desired frequency band. Amplifier 230 amplifies the output signal of bandpass filter 220 and causes the amplified signal to be transmitted via transmit antenna 250. The RF signal transmitted by antenna 250 is then received by receive antenna 130 of device 100. By comparing the difference between the RF signal being transmitted by antenna 110 at any given time to the RF signal being received by antenna 130 at that time, controller 150 determines the distance between devices 100 and 200.

In accordance with another embodiment of the present invention, the distance between the devices is determined by using highly reflective corner reflectors adapted to backscatter the transmitted RF signal. The RF signal backscattered by the corner reflector(s) is then received by the user. In such embodiments, a wireless communication link established between the user (or the setup device during the initial setup) and the service provider provides information from the user to the service provider regarding the amount of RF power being received by the user from the service provider. Accordingly, the ranging systems or sensors disposed in the service provider have a high degree of confidence that the signal being received by the service provider is transmitted by the user/setup device. In another embodiment, the user/setup device may receive and retransmit the RF signal after modifying the received signal. Such modifications include, but are not limited to, change in the frequency of the RF signal transmitted by the service provider, as well as addition of modulation encryption keys to facilitate position determination, and further distinguish the user/setup device from the surrounding objects or other users.

In accordance with another embodiment of the present invention, the service provider attaches a time stamp to a message it transmits. The user/setup device then attaches a second timestamp at the time of arrival of the message and returns the message with both time stamps. The time stamps are subsequently used to estimate the time of flight in order detect the distance between the two devices. The time stamp are quite accurate in determining the distance when using, for example, a GPS synchronized clock that is available in most of today's modern devices.

In one embodiment, the service provider is adapted to wirelessly transfer power to the user. The user can use the received power for operation or for charging its battery or short term storage (e.g., super capacitor). In such embodiments, the service provider may use synthetic aperture radar to form an RF energy focus zone where the user may recover the energy. The service provider may also use the synthetic aperture radar for ranging and sensing applications without the need for an extra radio-based location determination device.

In one embodiment, the service provider, delivering wireless power, switches its operation from RF Power lensing to synthetic aperture ranging and sensing by sending a train of EM pulses that scan along azimuth and elevation, and observing the reflections. The time of flight of the pulses provides the distance of the object (such as the user device or the set up device) for each elevation and azimuth. Accordingly, a full 3D mapping of the location of the object is obtained. In one embodiment, the user/setup device may modulate the back reflection intensity by changing the termination impedance of its antenna to uniquely identify itself from other objects that also reflect the pulses.

Figure 5:
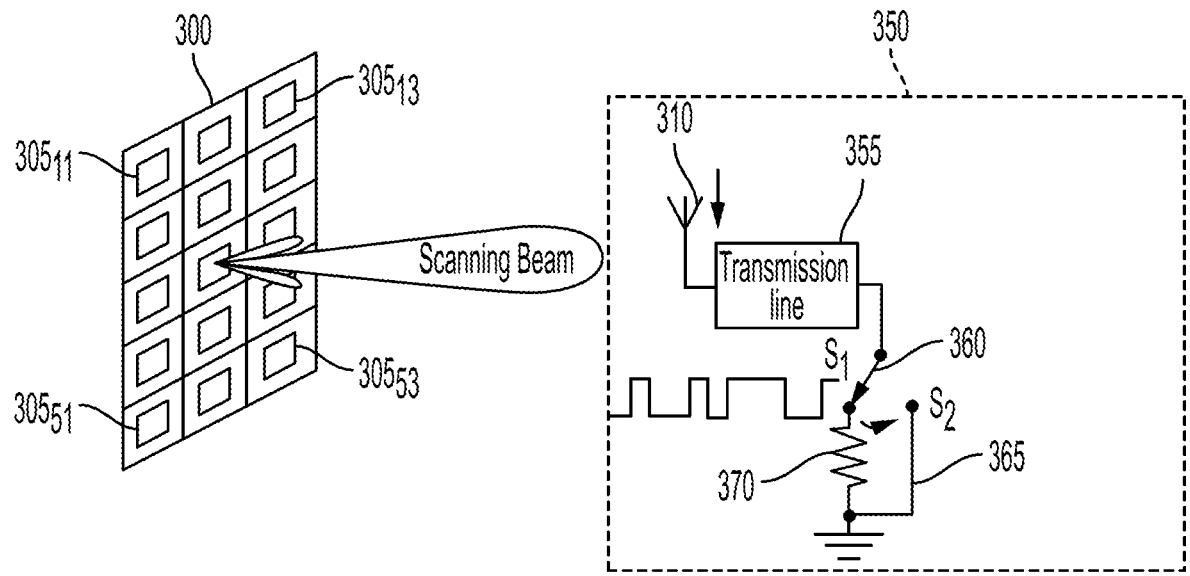
FIG. 5 is a simplified high-level block diagram of a wireless service delivery system, in accordance with one exemplary embodiment of the present invention.

FIG. 5 shows an exemplary service provider 300 adapted to deliver wireless service/power to service user 350, in accordance with one embodiment of the present invention. Service provide 300 is shown as including, in part, a 3×5 array of transmitters $305_{11}$, $305_{12}$, $305_{13}$ ... $305_{51}$, $305_{52}$ and $305_{53}$ adapted to, among other thing, deliver RF power to user device 350. User device 350 is shown as including, in part, an antenna 310, a transmission line 355, and a switch 360. It is understood that other components of device 350 are not shown for clarity. When switch 360 is in position $S_1$, the terminating impedance of antenna 310 is defined by the resistance of resistor 370 which has a finite resistance. When switch 360 is in position $S_2$, the terminating impedance of antenna 310 is defined by path 365 which is shorted to the ground. By changing the position of switch 360, the terminating impedance of antenna 310 and thus the amplitude of the signal being transmitted by antenna 310 is varied.

In another embodiment, the service provider, delivering wireless power, is adapted to switch operation from RF Power lensing to synthetic aperture ranging and sensing by sending a train of RF signals with, for example, linearly increasing frequency for each azimuth and elevation angle. The reflected RF signal will arrive at the service provider at a later time. The frequency difference between the transmitted and received signal at the service provider is proportional to time of flight which together with azimuth and elevation angles is used to create a 3D map of the surrounding, as was described further above. The user/setup device may be configured to modulate the reflections at a slower rate than the linearly increasing frequency period to identify itself.

In one embodiment, an ultrasonic range finder may be disposed in the service provider device and/or the user/setup device. In such embodiments, the service provider scans its beam through a multitude of azimuth and elevation angles. The user/setup device reports back to the service provider the received RF power via a wireless link. The azimuth and elevation of the user/setup device is determined when the maximum power is reported back by the user/setup device. The distance from the user/setup device to the service provider device is determined by the ultrasonic range finder. In one embodiment, the service provider (or the user/setup device) transmits a time coded ultrasonic signal (such as a linearly increasing frequency or pulses), and the user/setup (or the service provider) decodes the received acoustic signal so as to retrieve the encoded time and compare it its own local time. Using the time of flight and the speed of sound the distance between the two devices may be determined.

There are a number of advantages in using an acoustic range finder compared to an RF range finder. Because the speed of sound is six orders of magnitude (about one million times) smaller than the speed of light—hence time of flight of sound is six orders of magnitude longer—an acoustic range finder is easier and simpler to implement and can use lower speed electronic components.

Another advantage of an acoustic range finder is that it uses a lower amount of bandwidth for localization. Transmitting pulse or chirp signals for RF range detection requires large system bandwidth which not only complicates the system designs, but may result in interference with other systems operating within the same band. Detecting only elevation and azimuth requires a very small bandwidth as it relies on the received power.

Figure 6:
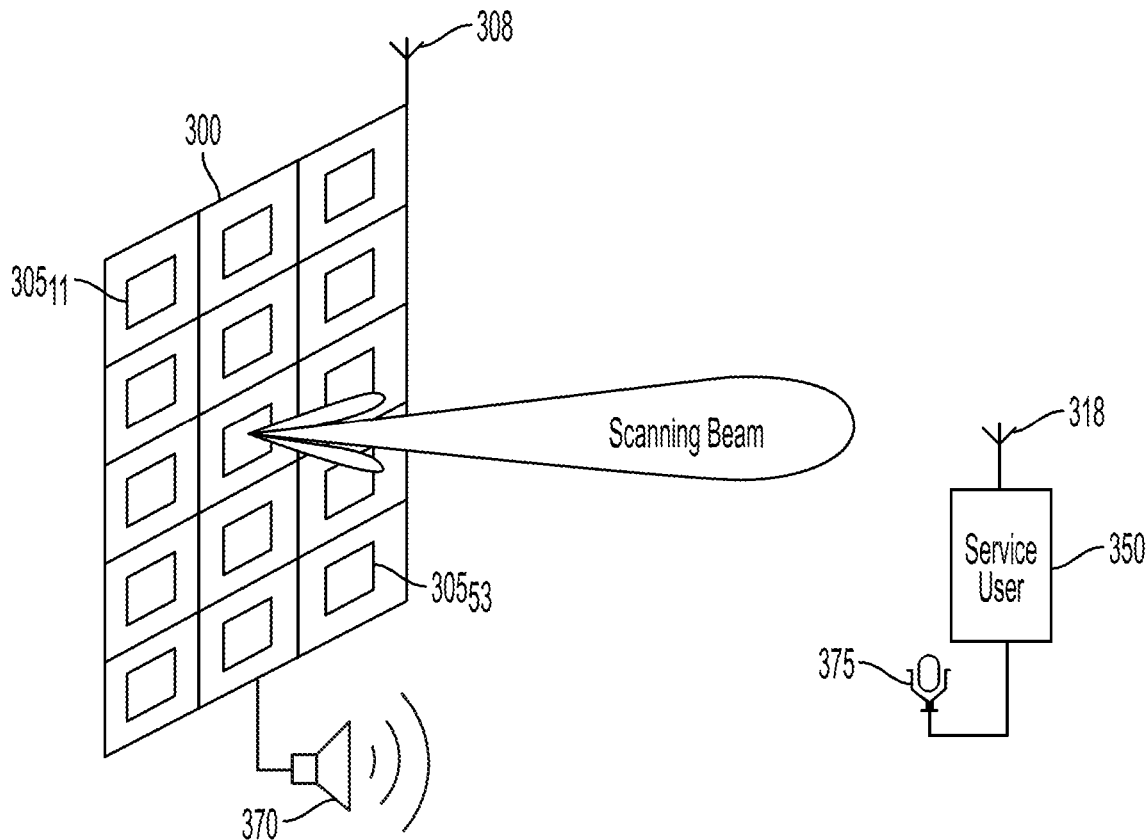
FIG. 6 is a simplified high-level block diagram of a wireless service delivery system, in accordance with one exemplary embodiment of the present invention.

FIG. 6 shows an exemplary service provider 300 adapted to deliver wireless service/power to user 350, in accordance with one embodiment of the present invention. Service provide 300 is shown as including, in part, an RF antenna 308, an acoustic signal transmitter 370, and a 3×5 array of transmitters $305_{11}$, $305_{12}$, $305_{13}$ ... $305_{51}$, $305_{52}$ and $305_{53}$ adapted to, among other thing, deliver RF power to user device 350. Device user 350 is shown as including, in part, an RF antenna 318, and acoustic detector 375. To locate user 350, service provider 350 transmits a time encoded acoustic signal via acoustic signal transmitter 370. The acoustic signal detector 375 receives and decodes the received acoustic signal so as to retrieve the encoded time and compare it to user 350's own local time. Using the time of flight and the speed of sound, the distance between service provider 300 and service user 350 is determined. Communication and transmission of information between service provider 300 and service user 350 is carried out via an RF link established between antennas 308 and 318, as shown.

Figure 7:
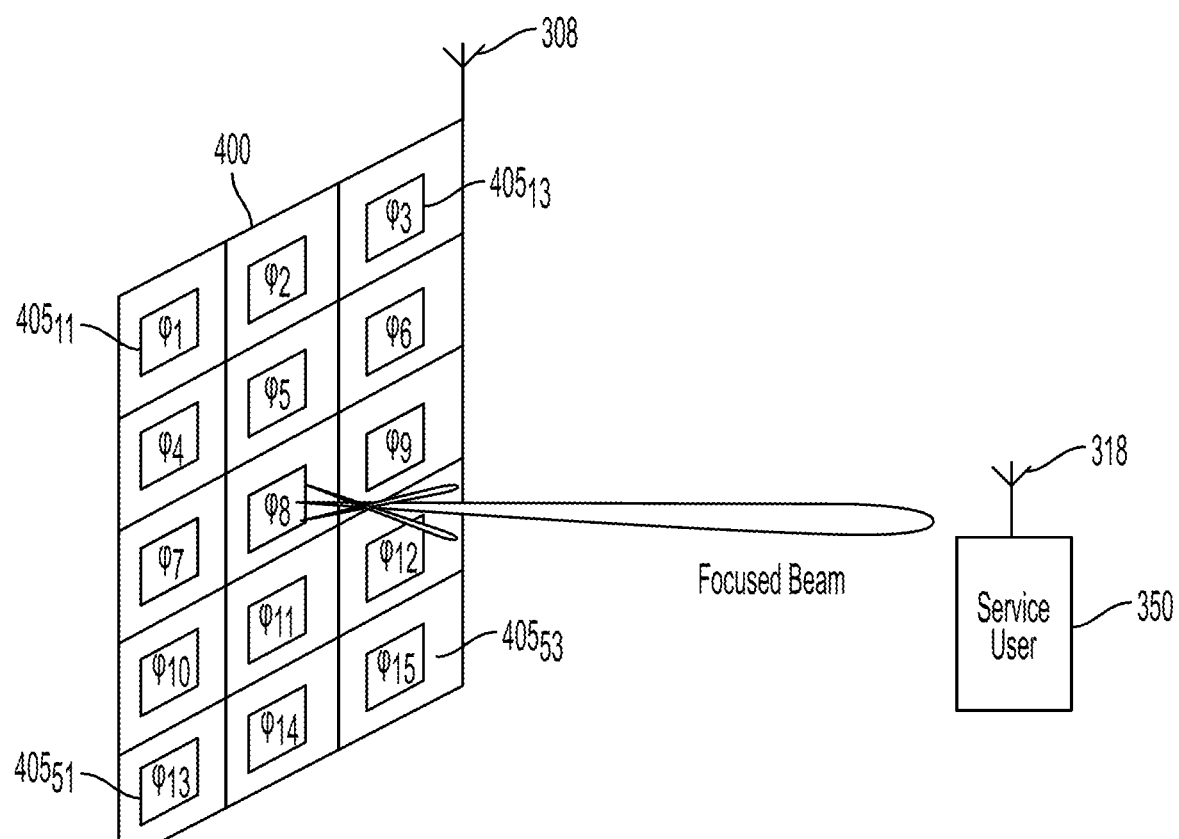
FIG. 7 is a simplified high-level block diagram of a wireless service delivery system, in accordance with one exemplary embodiment of the present invention.

In accordance with another embodiment, the position of a service/setup device relative to the service provider is obtained using the phase settings of a phased array disposed in the service provider. FIG. 7 shows an exemplary phased array 400 adapted to deliver wireless service/power to user 350, in accordance with one embodiment of the present invention. Phased array 400 is shown as including, in part, an RF antenna 308, and a 3×5 array of transmitting elements $405_{11}$, $405_{12}$, $405_{13}$ ... $405_{51}$, $405_{52}$ and $405_{53}$ adapted to, among other thing, deliver RF power to device 350. User device 350 is shown as including, in part, an RF antenna 318. For a relatively large phased array, powering up devices not very far away (i.e., within the phased array's Fresnel diffraction region), the phase profile distribution that maximizes power transfer to the user device uniquely identifies the device location. For an optical phased array, the phase profile distribution or settings that maximizes power transfer corresponds to the one that focuses the light from various transmitting elements to the position of the user device. Accordingly, the authorized regions (regions that are designed for authentication) in space are mapped to a multidimensional phase space.

The above embodiments of the present invention are illustrative and not limitative. Embodiments of the present invention are not limited by the type of device that may be wirelessly charged. Other additions, subtractions or modifications are obvious in view of the present disclosure and are intended to fall within the scope of the appended claims.

What is claimed is:

1. A method of wireless service delivery comprising:
    determining a position of a first device requesting the wireless service; delivering a wireless service, from a second device, defined by a first tier/quality to the first device if the position is determined to fall within a first region of space; delivering, from a second device, a wireless service defined by a second tier/quality to the first device if the position is determined not to fall within the first region of space; and powering the first device from a first radio frequency (RF) signal carrying the wireless service, wherein said second device is adapted to determine a position of the first device by comparing the first RF signal to a second RF signal transmitted by the first device in response to the first RF signal.

2. The method of claim 1 wherein said first tier/quality of service provides a faster access than the second class/quality of service.

3. The method of claim 2 wherein said second tier/quality of service is defined by no wireless access.

4. The method of claim 1 further comprising:
storing a plurality of coordinates representative of a boundary of the first region of space.

5. The method of claim 4 wherein said plurality of coordinates is stored in a memory disposed in a second device providing the wireless service.

6. The method of claim 5 further comprising:
identifying the plurality of coordinates by a localization device that is physically distinct from the second device.

7. The method of claim 6 wherein the position of the first device is determined by the localization device.

8. The method of claim 6 further comprising:
identifying the plurality of coordinates during a setup phase by moving the localization device along a perimeter of the first region of space.

9. The method of claim 6 wherein said second device comprises a controller adapted to increase a frequency of a first RF signal the second device transmits to the localization device.

10. The method of claim 9 wherein said localization device comprises:
a mixer adapted to downconvert the frequency of the received first RF signal;
a bandpass filter adapted to filter out components of the downconverted RF signal that fall outside a predefined frequency band;
an amplifier adapted to amplify the filtered RF signal; and
an antenna adapted to transmit the amplified RF signal.

11. The method of claim 9 wherein said frequency is increased linearly in time.

12. The method of claim 5 further comprising:
transmitting an RF signal from the second device;
positioning a reflector in a path of the transmitted RF signal thereby causing a reflected RF signal to reach the first device;
transmitting information from the first device to the second device about an amount of power in the reflected RF signal received by the first device; and
determining the position of the first device relative to the second device at the second device from the received power information.

13. The method of claim 5 further comprising:
transmitting a first RF signal from the second device to the first device, said RF signal comprising a first time stamp;
receiving the first RF signal at the first device;
recovering the first time stamp at the first device;
recording a time at which the first RF signal is received by the first device, said recorded time corresponding to a second time stamp; and
determining a position of the first device relative to the second device from the first and second time stamps.

14. The method of claim 5 further comprising: forming a synthetic aperture radar to deliver an RF signal to the first device.

15. The method of claim 1 further comprising:
sending a plurality of electromagnetic pulses scanning along a plurality of azimuth and elevations, said plurality of pulses oriented toward the first device; and
providing a 3-D mapping of the position of the first device from a time of flight of pulses reflected by the first device.

16. The method of claim 5 further comprising:
transmitting a time-encoded acoustic signal from the second deice to the first device;
recovering the encoded time at the first device;
comparing a time at which the acoustic signal is received by the first device to the encoded time to determine a time difference; and
determining a position of the first device relative to the second device from the time difference.

17. The method of claim 5 wherein said second device is a phased array.

18. A wireless service delivery system configured to:
determine a position of a first device requesting the wireless service; deliver a wireless service defined by a first tier/quality to the first device if the position is determined to fall within a first region of space; deliver a wireless service defined by a second tier/quality to the first device if the position is determined not to fall within the first region of space;
and power the first device using a first radio frequency (RF) signal via which the wireless service is delivered, wherein said wireless delivery system is adapted to determine a position of the first device by comparing the first RF signal to a second RF signal transmitted by the first device in response to the first RF signal.

19. The wireless service delivery system of claim 18 wherein said first tier/quality of service provides a faster access than the second class/quality of service.

20. The wireless service delivery system of claim 19 wherein said second tier/quality of service is defined by no wireless access.

21. The wireless service delivery system of claim 18 further comprising:
a memory storing a plurality of coordinates representative of a boundary of the first region of space.

22. The wireless service delivery system of claim 21 further comprising: a localization device adapted to identify the plurality of coordinates.

23. The wireless service delivery system of claim 22 wherein the localization device is further adapted to determine the position of the first device.

24. The wireless service delivery system of claim 22 wherein the localization device is further adapted to identify the plurality of coordinates during a setup phase as it is moved along a perimeter of the first region of space.

25. The wireless service delivery system of claim 22 wherein said delivery system further comprises a controller adapted to increase of a frequency of a first RF signal the wireless service delivery system transmits to the localization device.

26. The wireless service delivery system of claim 25 wherein said localization device comprises:
a mixer adapted to downconvert the frequency of the received first RF signal;
a bandpass filter adapted to filter out components of the downconverted RF signal that fall outside a predefined frequency band;
an amplifier adapted to amplify the filtered RF signal; and
an antenna adapted to transmit the amplified RF signal.

27. The wireless service delivery system of claim 26 wherein said frequency is increased linearly in time.

28. The wireless service delivery system of claim 18 wherein the wireless service delivery system is further adapted to form a synthetic aperture radar to deliver an RF signal to the first device.

29. The wireless service delivery system of claim 18 wherein the wireless service delivery system is further adapted to:

send a plurality of electromagnetic pulses scanning along a plurality of azimuth and elevations, said plurality of pulses oriented toward the first device; and provide a 3-D mapping of the position of the first device from a time of flight of pulses reflected by the first device.

30. The wireless service delivery system of claim 18 wherein the wireless service delivery system is a phased array.

\* \* \* \* \*